United States Patent [19]

Whelpley et al.

[11] Patent Number: 5,127,622
[45] Date of Patent: Jul. 7, 1992

[54] FLUIDIC VIBRATION CANCELLATION MOUNT AND METHOD

[75] Inventors: Gordon E. Whelpley, Chandler; John F. Thurston, Mesa, both of Ariz.

[73] Assignee: Allied-Signal Inc., Morris Township, Morris County, N.J.

[21] Appl. No.: 722,033

[22] Filed: Jun. 27, 1991

[51] Int. Cl.⁵ .............................................. F16M 13/00
[52] U.S. Cl. ................................. 248/550; 248/566; 248/631; 248/638; 267/136
[58] Field of Search ............... 248/550, 566, 631, 638; 137/833; 267/64.24, 64.27, 127, 136, 113, 122

[56] References Cited

U.S. PATENT DOCUMENTS

| | | | |
|---|---|---|---|
| 2,964,272 | 12/1960 | Olson | 248/638 X |
| 3,189,303 | 6/1965 | Boothe | 248/550 |
| 3,216,679 | 11/1965 | Curwen | 248/550 |
| 3,606,233 | 9/1971 | Scharton et al. | 248/550 |
| 3,701,499 | 10/1972 | Schubert et al. | 248/550 X |
| 4,033,541 | 7/1977 | Malueg | 248/550 |
| 4,336,917 | 6/1982 | Phillips | 248/550 |
| 4,363,377 | 12/1982 | Van Gerpen | 248/550 X |
| 4,546,960 | 10/1985 | Abrams et al. | 267/136 |
| 4,757,980 | 7/1988 | Schubert | 267/136 |
| 4,802,648 | 2/1989 | Decker et al. | 248/550 |
| 4,828,234 | 5/1989 | Hoying et al. | 248/550 X |
| 4,874,016 | 10/1989 | Tseng | 137/833 X |
| 4,930,357 | 6/1990 | Thurston et al. | 137/833 X |

*Primary Examiner*—Carl D. Friedman
*Assistant Examiner*—Derek J. Berger
*Attorney, Agent, or Firm*—Jerry J. Holden; James W. McFarland; Robert A. Walsh

[57] ABSTRACT

A vibration cancellation mount for use in a vibration cancellation system is provided that includes a fluidic driver providing a modulated air stream to an elastomeric air spring. The pressure of the air stream is caused to fluctuate by an acoustical cancelling signal generated by an electroacoustic transducer electrically coupled to cancellation controller. As this pressure varies the air spring is filled and vented so that it responds at the same frequency and phase as the cancellation signal and thereby cancels the vibrations emanating from a vibrating structure mounted thereto. By employing a fluidic driver, the vibration cancellation mount is not frequency limited and can cancel vibrations having frequencies anywhere in the audio frequency spectrum.

13 Claims, 3 Drawing Sheets

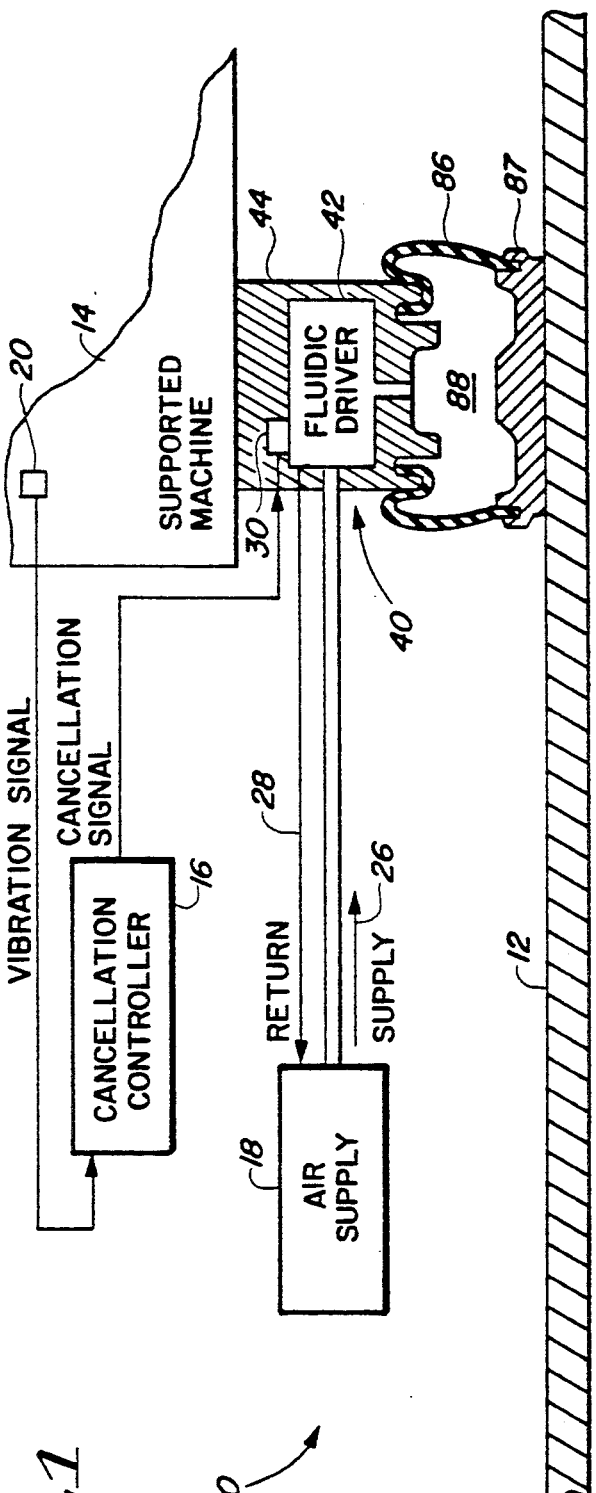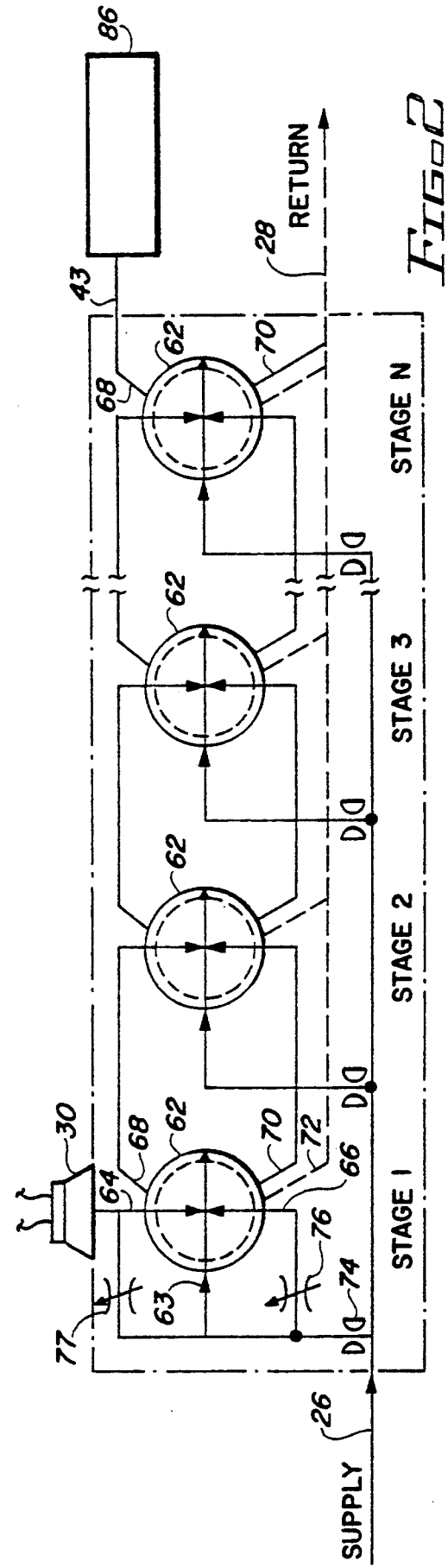

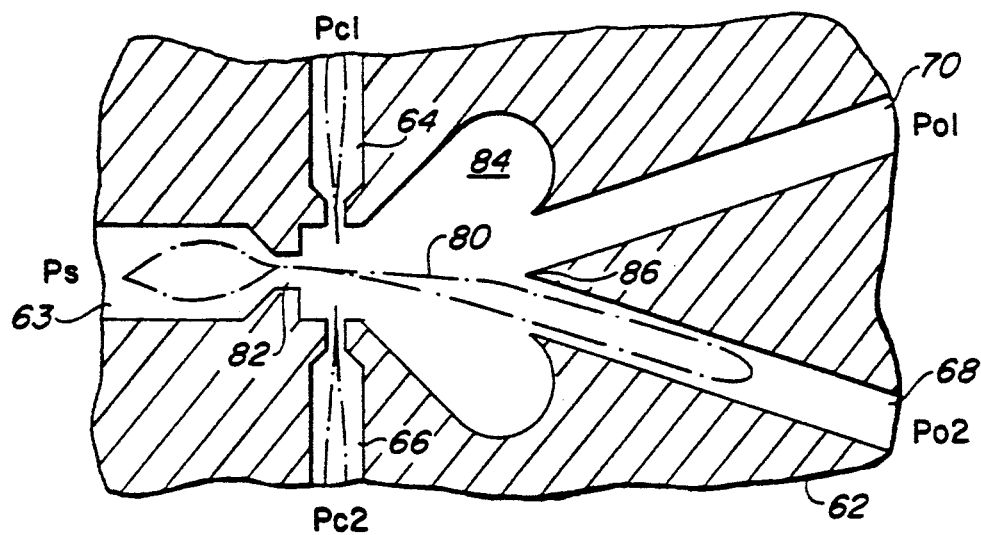

FLUIDIC VIBRATION CANCELLATION MOUNT AND METHOD

TECHNICAL FIELD

The present invention relates generally to an apparatus and method for isolating vibrating structures and in particular, to a vibration cancellation mount and method that comprises a fluidic driver filling and venting an elastomeric air spring so that the spring oscillates at the frequency and phase that cancels the vibrations emanating from the vibrating structure mounted thereto. By employing a fluidic driver, the vibration cancellation mount does not suffer from high distortion when subjected to frequencies substantially higher than 100 Hz.

BACKGROUND OF THE INVENTION

Olson, U.S. Pat. No. 2,964,272 discloses the basic concept behind vibration cancellation systems. Olson discloses a system comprised of a driving element, a vibration sensing element and an electrical signal amplifier. The sensing element senses the vibration of a structure and converts the vibration to an electrical signal which is then sent to the amplifier. The amplifier amplifies this signal which operates the driver. The driver, which is mounted between the vibrating structure and a static structure, converts the signal from the amplifier into a mechanical force. By adjusting the phase of the signal coming from the amplifier the driver can be operated so as to counteract the vibration emanating from the structure.

Over the years various forms and types of vibration cancellation systems have been suggested and employed in a variety of applications.

Boothe, U.S. Pat. No. 3,189,303 discloses an active mount for supporting heavy machinery comprised of a pneumatic container or air spring for supporting a load, and a system for supplying air to the container in accordance with the force applied thereto by the load. The pneumatic system utilizes an air source for supplying air to a first valve which is positioned to be actuatable by the force of the load and designed to produce a pressure which is proportional to the force of the load. Air from the first regulator is directed through a stabilizing zone to a second valve and from the second valve, the air is delivered to the air spring.

Curwen, U.S. Pat. No. 3,216,679 discloses an active vibration isolator comprised of a vertically displaceable piston disposed within a cylinder and having means for receiving a load. A valve controls the flow of gas into the cylinder so as to move the piston vertically in response to the load.

Scharton et al., U.S. Pat. No. 3,606,233 discloses a combined active and passive isolation mount wherein the active portion includes a piston, coupled to the vibration sources via a piston rod, adapted for movement within a cylinder to which the isolated mass is mechanically coupled. The piston separates two chambers within the cylinder. The system provides isolation by using a servovalve to control the relative pressure between the chambers in such a manner that the velocity of the cylinder counteracts the velocity of the piston.

Schubert et al., U.S. Pat. No. 3,701,499 discloses an active isolation system that includes a servovalve controlled hydraulic actuator to cancel vibrations Malueg, U.S. Pat. No. 4,033,541 discloses a system that uses linear actuators to stabilize sensitive apparatus from translational and rotational vibrations emanating from the structure on which the apparatus is mounted.

Phillips, U.S. Pat. No. 4,336,917 discloses a shock and vibration isolation system having a plurality of isolators. Each isolator has two gas driven pistons connected to an accumulator/controller that supplies controlled amounts of air. The flow of gas into the accumulator/controller is governed by a valve.

Van Gerpen, U.S. Pat. No. 4,363,377 discloses an active seat suspension control system in which a hydraulic cylinder is coupled to the seat. A source of pressurized fluid to the cylinder allows the vertical position of the seat to be adjusted. The amount of gas flow into the cylinder is governed by an electrohydraulic valve.

Abrams et al., U.S. Pat. No. 4,546,960 discloses a vibration isolation assembly which includes a servovalve in operative communication between a fluid supply source, a gas supply source and a viscous damper. Control logic means governs the servovalve to adjust both the gas and fluid pressures in the viscous damper in response to sensed vibration so as to attenuate the vibration.

Schubert, U.S. Pat. No. 4,757,980 discloses a vibration isolation system comprising a damper having a servovalve fluidly coupling a load supporting actuator to an accumulator.

Decker et al., U.S. Pat. No. 4,802,648 discloses an engine mount having an air cushion which functions like a pneumatic spring element and which can be inflated and vented via a valve device.

Hoying et al., U.S. Pat. No., 4,828,234 discloses a hydraulic mount assembly with a self-pumping air bladder. The pressurization of the bladder is controlled by a pneumatic control circuit that includes check valves and shuttle valves.

Each of the arrangements described in the above mentioned patents employs some type of mechanical device such as a valve, servovalve or actuator to transform the amplitude and frequency of an electrical cancelling signal into a mechanical cancelling oscillation having the same frequency and amplitude. Because these devices are comprised of mechanically linked, moving parts, they suffer from high distortion when subjected to high frequency signals, and consequently, are unable to vary the pressure of a gas or fluid fast enough to generate a consistent cancelling signal. Thus for example, the systems in Abrams et al., Scharton et al., Schubert et al., and Malueg all have an upper frequency limit of about 100 Hz.

Accordingly, a need exists for a vibration cancellation mount that can operate at frequencies substantially greater than 100 Hz without suffering from the high distortion experienced by the systems found in the prior art.

SUMMARY OF THE INVENTION

An object of the present invention is to provide a vibration cancellation mount that has a minimum of moving parts.

Another object of the present invention is to provide a vibration cancellation mount that is compact and lightweight.

Yet another object of the present invention is to provide a vibration cancellation mount that can operate at frequencies substantially greater than 100 Hz.

The present invention achieves the above-stated objects by incorporating within a vibration cancellation system a fluidic driver that fills and vents an elastomeric air spring so that the spring's oscillations cancel any vibrations emanating from a vibrating structure mounted thereto.

These and other objects, features, and advantages of the present invention are specifically set forth in or will become apparent from the following detailed description of a preferred embodiment of the invention when read in conjunction with the accompanying drawings.

BRIEF DESCRIPTION OF THE DRAWINGS

FIG. 1 is a schematic of a vibration cancellation system incorporating the vibration cancellation mount contemplated by the present invention.

FIG. 2 is a fluidic circuit diagram of the vibration cancellation mount of FIG. 1.

FIG. 3 is a schematic representation in the form of a fluidic lamina of a fluidic amplifier used in the vibration cancellation mount of FIG. 2.

FIG. 5 is a partly cutaway, plan view of an alternative embodiment of the cancellation mount of FIG. 1.

DESCRIPTION OF THE PREFERRED EMBODIMENT

Figure 4:
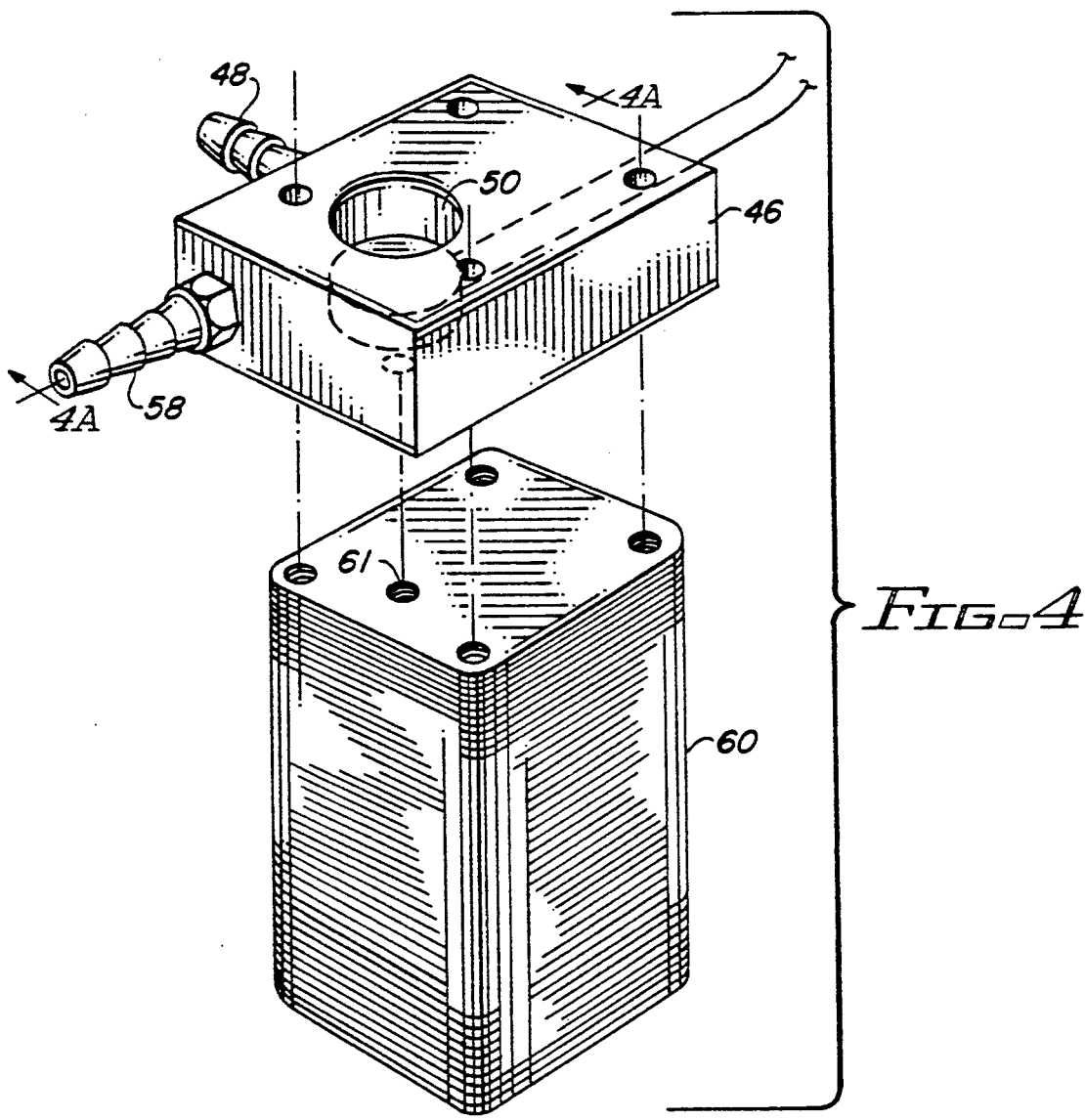
FIG. 4 is a exploded view of the fluidic driver of the cancellation mount of FIG. 1.
Figure 4A:
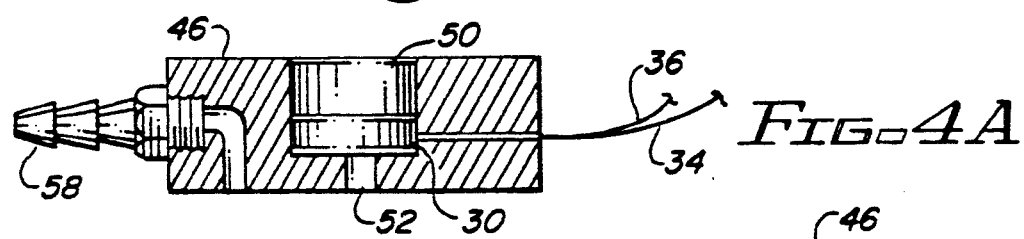
FIG. 4A is a cross-sectional view taken along line 4A—4A of FIG. 4.
Figure 4B:
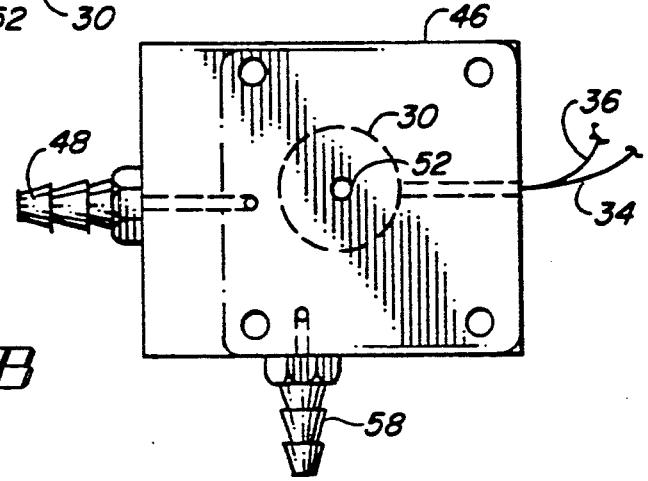
FIG. 4B is a bottom plan view of the sectional view driver of FIG. 4.

Referring to the drawings, FIG. 1 schematically depicts a vibration cancellation system generally denoted by the reference numeral 10, a supporting structure 12 which is to be isolated from any vibrations emanating from a vibrating supported structure 14. The vibration cancellation system 10 is comprised of a cancellation controller 16, an air supply 18, vibration sensors or accelerometers 20 and 21, and a vibration cancellation mount 40 which is operably disposed between the supporting structure 12 and the supported structure 14. The cancellation controller 15 receives electrical vibration signals from the sensor 20 mounted on the vibrating structure 14 and the sensor 21 mounted on the supporting structure 12, preferably, in close proximity to the mount 40. The controller 16 then generates an electrical cancellation signal. For example, if the sensors 20 and 21 detect a sinusoidal vibration, the controller 16 will generate a sinusoidal cancellation signal having an amplitude and phase such that the resulting motion of the mount 40 isolates the supporting structure 12 from the vibrating structure 14. The cancellation controller 16 is commercially available and can, for example, be purchased from Active Noise and Vibration Technologies, Inc., 3811 East Weir Avenue, Phoenix, Ariz. 85040. As a person having ordinary skill in the art would appreciate, the number and positioning of the vibration sensors may vary with different applications and controllers.

The mount 40 is comprised of a fluidic driver 42 coupled to an elastomeric air spring 86 having a rigid base 87. The fluidic driver 42 has a housing 44 encompassing an inlet member 46 mounted atop a stack 60 of fluidic laminae, (see FIG. 4). The member 46 has an inlet port 48 coupled to the air supply 18 via supply conduit 26, and an outlet port 58 coupled to the air supply 18 via a return conduit 28. An electroacoustic transducer 30 is mounted in a chamber 50 within the member 46. An inlet conduit 52 places the transducer 30 in fluidic communication with a hole 61 in the first lamina of the stack 60. Wires 34 and 36 couple the transducer 30 to the controller 16. The electroacoustic transducer 30 receives the electrical cancellation signal from the controller 16 and converts this signal into an acoustical signal.

The stack 60 of fluidic laminae is configured and arranged as a plurality of stages 1,2,3 . . . N in series. Each of the stages 1,2,3 . . . N includes one or more fluidic proportional amplifiers 62 in parallel arrangement. In the preferred embodiment, the stack 60 has four stages in series arrangement. The first stage having a single amplifier 62, the second stage having two amplifiers 62 in parallel arrangement, the third stage having four amplifiers 62 in parallel arrangement, and the fourth stage having six amplifiers 62 in parallel arrangement. For clarity FIG. 2 only depicts a single fluidic amplifier in each stage. As one skilled in the art would appreciate, the number of stages and/or the number of fluidic amplifiers must be selected so that the amplitude of the acoustic signal exiting the last stage matches the amplitude of the vibrations emanating from the vibrating structure 14.

FIG. 2 illustrates the configuration and arrangement of laminae in the stack 60 in the form of a fluidic circuit diagram. For purposes of clarity reference numerals are only indicated for the first stage. Each of the stages 1,2,3 . . . N, has an air supply port 63, a first and second control ports 64 and 66, a first and second output port 68 and 70 and a vent 72. The input port 63 is in fluid communication with the supply conduit 26 and the flow therebetween is controlled by a capillary 74. The first control port 64 is fluidly coupled to the transducer 30 and the second control port 66 is fluidly coupled to the supply conduit 26 downstream of the capillary 74. A needle valve 76 controls the flow to the second control port 66, and a needle valve 77 controls the flow to the first control port 64. The first and second output ports 68 and 70 are coupled to the first and second input ports of the next stage, with the final stage having one of its output ports 68 in fluid communication with the air spring 86 via an exit conduit 43. The other output port 70 and the vent 72 are disposed in fluid communication with the return conduit 28.

To fully appreciate what occurs within each of the stages 1,2,3 . . . N, a typical fluidic proportional amplifier 62 is depicted, schematically in the form of a fluidic lamina in FIG. 3. In the amplifier 62 the supply pressure Ps in the supply port 63 is converted to velocity in the form of a jet of fluid 80 issuing from a nozzle 82. The jet of fluid 80 travels from the exit of the nozzle 82, across a vent region 84, to a splitter 86, and then to the first and second output ports 68 and 70. The first and second control ports, 64 and 66 respectively, are located immediately downstream of the nozzle 82, perpendicular to the jet 80, and opposite each other. The jet 80 is easily deflected laterally by the control pressures Pc1 and Pc2 which are a small fraction of the supply pressure Ps. If the control pressures Pc1 and Pc2 are equal, the jet 80 is not deflected and divides equally at the the splitter 86. The pressures, Po1 and Po2, recovered at each output port 68 and 70 are then the same. If the control pressures Pc1 and Pc2 are unequal, the differential pressure between the two control pressures will cause the jet 80 to deflect away from the control port with the higher pressure. Deflection of the jet 80 causes the output port that receives a larger portion of the jet to recover more pressure. The difference in recovered pressure (Po2—Po1) is proportional to the degree of deflection of the jet 80 which is in turn proportional to the difference in control pressures (Pc1−Pc2).

In the embodiment depicted in FIG. 1, the elastomeric air spring 86 has a single active chamber 88 which receives the jet 80 through the exit conduit 43 of the stack 60. The chamber 88 is active in that it expands and contracts in response to being filled and vented of air due to fluctuations in the jet 80. Importantly, in order for the air spring 86 to expand and contract sufficiently to counter the dynamic forces of the vibrating structure 14 at high frequencies, its interior surface must be exposed to a substantially uniform pressure distribution in all directions. This means that standing waves must not be allowed to form either within the interior volume of the air spring 86 or within the conduit 43 which places the interior of the mount 86 in fluid communication with the discharge of the fluidic driver 42. Because the wavelength of an acoustical signal is inversely proportional to its frequency, it has been found that the formation of such waves can be prevented if the interior of the air spring 86 is configured so that its largest, linear dimension 85 is smaller than the wavelength of the acoustical signal at the highest frequency at which the cancellation mount will be operating for a particular application. Preferably, the dimension 85 is about a tenth or less than this wavelength. The air spring 86 is commercially available and can be purchased, for example, from Firestone Industrial Products Company, 1700 Firestone Blvd., Noblesville, Ind. 46060-3023.

Alternately, a dual chamber air spring 90 can be used, (see FIG. 5). The dual chamber air spring 90 has an active chamber 92 separated from a passive chamber 94 by a reaction mass 96. The chamber 92 functions like chamber 88 but has a smaller volume, while the chamber 94 is passive in that the volume of air within the chamber 94 remains substantially constant. An orifice 97 within the reaction mass 96 places the chambers 92 and 94 in fluid communication with each other and prevents the fluctuations in the active chamber 92 from affecting the air in the passive chamber 94. Preferably, the reaction mass 96 is coupled to the air spring 90 by a clamp 99. Because the dual chamber air spring 90 has a smaller active volume than the air spring 86, it does not require as large a force to cause it to expand, and therefore it can be driven by a smaller fluidic drive. Another advantage to the dual chamber air spring 90 is that in the event of a failure in the cancellation system 10, the passive chamber 94 will still provide some dampening of the vibrations emanating from the vibrating structure 14 due to the spring's elasticity and the compressibility of the air held therein. As in the chamber 88, to avoid standing waves, the largest, linear dimension 95 of the active chamber 92 is sized to be smaller than the wavelength of the acoustical signal at the highest frequency at which the cancellation mount will be operating for a particular application. Preferably, the dimension 95 is about a tenth or less than this wavelength.

In operation, the sensors 20 and 21 detect a vibration and transmit a vibration signal to the controller 16. In response, the controller 16 generates a cancellation signal. The transducer 30 receives the cancellation signal and converts it into an acoustic signal. This acoustic signal causes the difference in control pressures (Pc1−Pc2) in the fluidic driver 42 to fluctuate synchronously with the acoustic signal, which in turn causes the jet 80 to deflect synchronously with the cancellation signal. As the jet 80 is deflected, the air spring 86 is alternately filled and vented with air so that the air spring 86 expands and contracts to match the amplitude of the detected vibration, but sufficiently out of phase with this vibration so as to effectively cancel it. For example, as a vibration forces the vibrating structures 14 toward the supporting structure 12 the fluidic driver 42 pumps air into the air spring 86 so that it expands sufficiently to counter this movement.

Because the fluidic driver 42 has no mechanically moving parts, it does suffer from high distortion at frequencies greater than 100 Hz. Consequently, the vibration cancellation mount 40 is readily capable of cancelling vibrations having frequencies anywhere in the audio frequency spectrum so long as the interior dimensions of the mount 40 are sufficiently small so as not to generate a standing wave therein at the highest frequency of interest.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A vibration cancellation mount for use in a vibration cancellation system that includes a controller generating an electrical vibration cancellation signal and an air supply, comprising;
   an electroacoustic transducer electrically coupled to said controller for converting said electrical cancellation signal into an acoustical cancellation signal,
   an elastomeric air spring; and
   a fluidic driver, in fluid communication with said air supply and said transducer, for varying the flow rate of a jet of air synchronously with said acoustical cancellation signal, said air spring receiving said air jet and expanding and contracting in response thereto.

2. The vibration cancellation mount of claim 1 wherein said air spring has an active chamber.

3. The vibration cancellation mount of claim 2 wherein said active chamber defines an interior volume with its largest linear dimension less than the wavelength of the acoustical cancellation signal at its highest frequency so that a standing wave is not generated therein when operating at said highest frequency.

4. The vibration cancellation mount of claim 3 wherein said linear dimension is at least one tenth the wavelength of the acoustical cancellation signal at its highest frequency.

5. The vibration cancellation mount of claim 2 wherein said air spring has a passive chamber separated from said active chamber by a reaction mass, said active and passive chambers being in fluid communication via an orifice.

6. The vibration cancellation mount of claim 5 wherein said active chamber defines an interior volume having its largest linear dimension less than the wavelength of the acoustical cancellation signal at its highest frequency so that a standing wave is not generated therein when operating at said highest frequency.

7. The vibration cancellation mount of claim 6 wherein said linear dimension is at least one tenth the wavelength of the acoustical cancellation signal at its highest frequency.

8. The vibration cancellation mount of claim 1 wherein said fluidic driver includes a plurality of fluidic laminae configured and arranged as a plurality of fluidic proportional amplifier stages in series.

9. The vibration cancellation mount of claim 8 wherein said fluidic laminae has a means for receiving said acoustical cancellation signal.

10. A vibration cancellation mount for use in a vibration cancellation system for isolating a first structure from a second vibrating structure that includes a controller generating an electrical vibration cancellation signal and an air supply, comprising;
    an electroacoustic transducer electrically coupled to said controller for converting said electrical cancellation signal into an acoustical cancellation signal,
    an elastomeric air spring having a rigid base mounted to said first structure;
    a stack of fluidic laminae having an air supply port, first and second control ports, a vent port, and an output port;
    an inlet member mounted between said stack and said vibrating structure, said inlet member having a first port for communicating air from said air supply to said supply port and said first and second control ports, a second port for communicating air from said vent port to said air supply, a slot for receiving said electroacoustic transducer, and an inlet conduit between said transducer and said first control port; and
    an outlet member disposed between said stack and said air spring, said outlet member having an exit conduit between said output port and said air spring.

11. The vibration cancellation mount of claim 10 wherein said exit conduit is of sufficient length so that a standing wave is not generated therein when operating at the highest frequency of said acoustical cancellation signal.

12. A vibration cancellation system for isolating a first structure from a vibrating, second structure, comprising;
    an air supply;
    at least one vibration sensor mounted on said vibrating structure;
    a controller, electrically coupled to said sensor, for generating a vibration cancellation signal; and
    a vibration cancellation mount positioned between said first structure and said vibrating structure, said mount comprising an electroacoustic transducer electrically coupled to said controller for converting said electrical cancellation signal into an acoustical cancellation signal, a fluidic driver in fluid communication with said air supply and said transducer, for varying the flow rate of a jet of air synchronously with said acoustical cancellation signal, and an air spring receiving said air jet and oscillating synchronously therewith.

13. A method for isolating a first structure supporting a vibrating, second structure comprising the steps of;
    measuring the amplitude and frequency of the vibration emanating from said said first and second structures;
    generating, from the measurements in the preceding step, an electrical, cancelling signal;
    converting said electrical signal into an acoustical signal;
    fluidically amplifying said acoustical signal; and
    expanding and contracting an air spring disposed between said first and second structures synchronously in response to said amplified acoustical signal so that said air spring vibrates synchronously with said electrical, cancelling signal.

* * * * *